(12) United States Patent
Sauvalle

(10) Patent No.: US 11,111,880 B2
(45) Date of Patent: Sep. 7, 2021

(54) NACELLE OF A TURBOJET ENGINE COMPRISING A THRUST-REVERSING DOOR

(71) Applicant: Airbus Operations SAS, Toulouse (FR)

(72) Inventor: Thomas Sauvalle, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 233 days.

(21) Appl. No.: 16/277,329

(22) Filed: Feb. 15, 2019

(65) Prior Publication Data

US 2019/0257267 A1  Aug. 22, 2019

(30) Foreign Application Priority Data

Feb. 22, 2018 (FR) ...................................... 1851529

(51) Int. Cl.
*F02K 1/70* (2006.01)
*F02K 1/72* (2006.01)
(Continued)

(52) U.S. Cl.
CPC .............. *F02K 1/70* (2013.01); *B64D 29/06* (2013.01); *F02K 1/72* (2013.01); *F02K 1/763* (2013.01);
(Continued)

(58) Field of Classification Search
CPC ..... F02K 1/72; F02K 1/70; F02K 1/62; F02K 1/625; F02K 1/763; B64D 29/06
See application file for complete search history.

(56) References Cited

U.S. PATENT DOCUMENTS 4,278,220 A * 7/1981 Johnston ................... F02K 1/72
244/110 B
2001/0010148 A1 8/2001 Michel et al.
(Continued)

FOREIGN PATENT DOCUMENTS

FR  2986212 A1  8/2013
GB  1303875 A   1/1973

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

A nacelle comprising a fixed structure, a fixed cowl, a mobile cowl, and a motor arrangement to translationally displace the mobile cowl from a closed to an open position on the fixed structure. The nacelle comprises a window delimited between the fixed and mobile cowls and open between a secondary turbojet and the outside, a thrust-reversing door rotationally mobile about a rotational axis between retracted and active positions, and a driving mechanism which coordinates and defers the switch from the retracted to the active position with the switch from the closed to the open position. The driving mechanism comprises two connecting rods rotationally mobilely mounted on the fixed structure and bearing a wheel, a mobile cowl groove which slidingly receives the wheel, a guide integral to the thrust-reversing door, and a runner rotationally mobilely mounted between the connecting rods, as well as mounted to slide along the guide.

6 Claims, 3 Drawing Sheets

(51) Int. Cl.
*B64D 29/06* (2006.01)
*F02K 1/76* (2006.01)
*F02K 3/06* (2006.01)

(52) U.S. Cl.
CPC ............ *F02K 3/06* (2013.01); *F05D 2240/14* (2013.01); *F05D 2260/50* (2013.01)

(56) References Cited

U.S. PATENT DOCUMENTS

| | | | | |
|---|---|---|---|---|
| 2012/0138707 A1* | 6/2012 | Vauchel | ................... | F02K 1/763 239/265.29 |
| 2014/0131480 A1* | 5/2014 | Hurlin | ...................... | F02K 1/566 239/265.19 |
| 2016/0153399 A1* | 6/2016 | Sawyers-Abbott | ........ | F02K 1/72 239/1 |
| 2016/0169157 A1* | 6/2016 | Sawyers-Abbott | ........ | F02K 1/72 239/1 |

\* cited by examiner

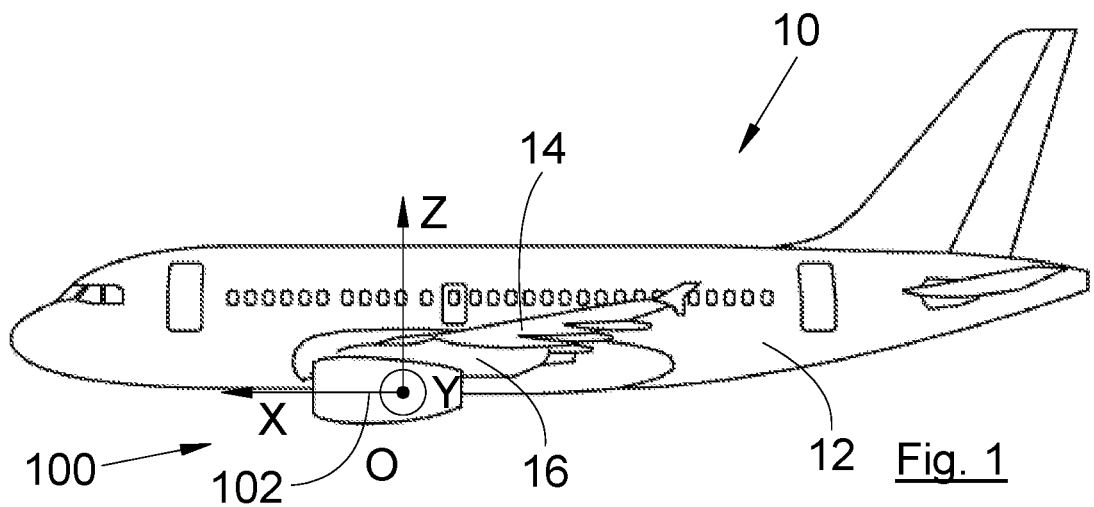
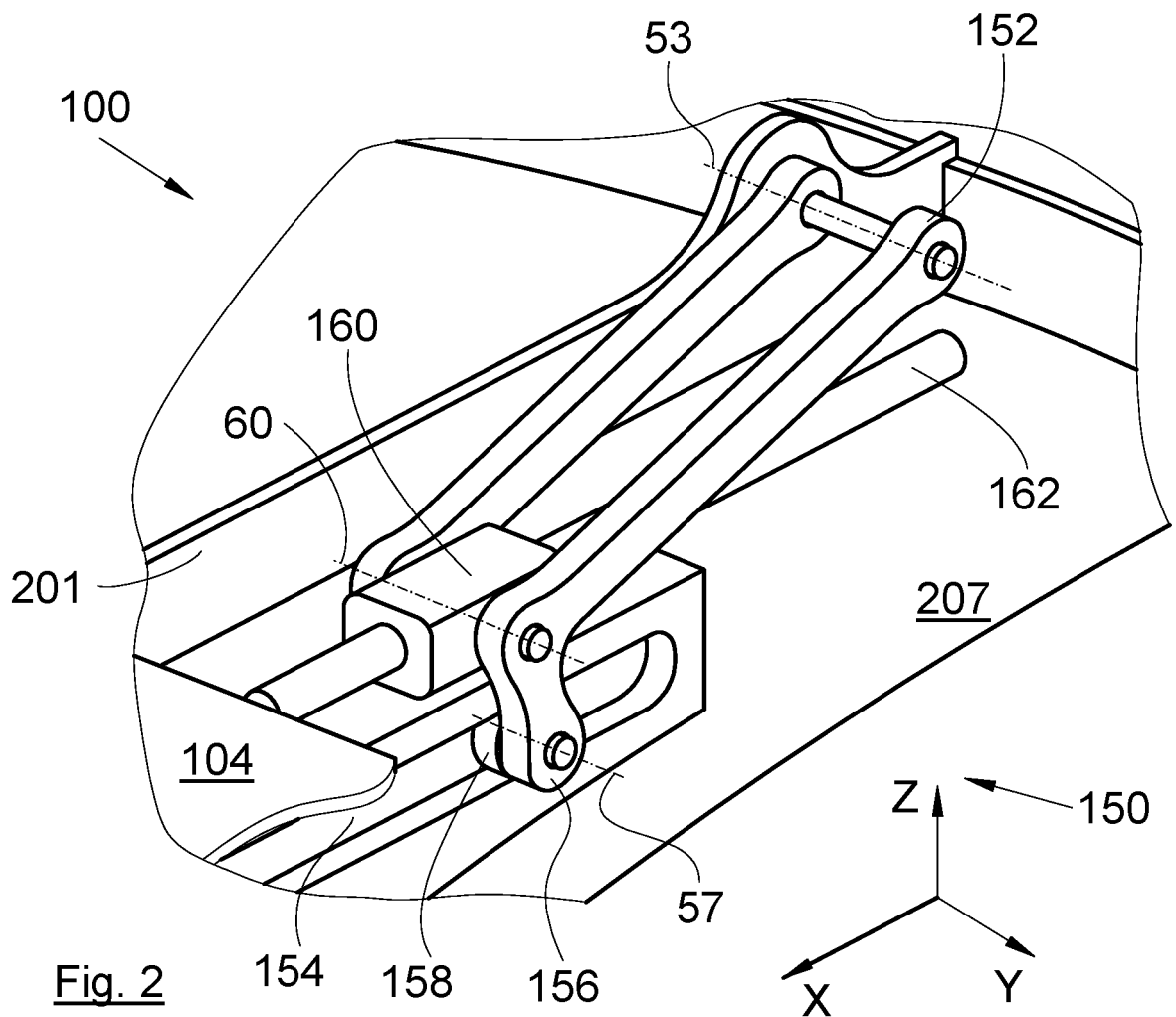

NACELLE OF A TURBOJET ENGINE COMPRISING A THRUST-REVERSING DOOR

CROSS-REFERENCES TO RELATED APPLICATIONS

This application claims the benefit of the French patent application No. 1851529 filed on Feb. 22, 2018, the entire disclosures of which are incorporated herein by way of reference.

FIELD OF THE INVENTION

The present invention relates to a nacelle of a dual flow turbojet engine which comprises at least one thrust-reversing door, a dual flow turbojet engine comprising such a nacelle and an engine, and an aircraft comprising at least one such dual flow turbojet engine.

BACKGROUND OF THE INVENTION

An aircraft comprises a fuselage, on each side of which is fixed a wing. Under each wing there is suspended at least one dual flow turbojet engine. Each dual flow turbojet engine is fixed under the wing via a pylon which is fixed between the structure of the wing and the structure of the dual flow turbojet engine.

The dual flow turbojet engine comprises an engine, a nacelle which is fixed around the engine and a secondary turbojet which is between the engine and the nacelle and which allows the passage of a secondary flow.

The nacelle comprises at least one thrust-reversing door which is mobile between a retracted position in which it is positioned outside of the secondary turbojet so as not to form an obstacle to the secondary flow, and an active position in which it is positioned across the secondary turbojet so as to form an obstacle to the secondary flow to direct it radially outwards from the nacelle through a window provided for this purpose.

Conventionally, the thrust-reversing door is mounted to be rotationally mobile on the structure of the nacelle and a mechanism displaces it from the retracted position to the active position and vice versa.

Although the mechanism of such a thrust-reversing door is fully satisfactory, it is desirable to find different mechanisms.

SUMMARY OF THE INVENTION

One object of the present invention is to propose a nacelle comprising at least one thrust-reversing door with a different opening mechanism.

To this end, a nacelle is proposed for a dual flow turbojet engine, the nacelle comprising:
a fixed structure,
a fixed cowl fixedly mounted on the fixed structure and a mobile cowl that is translationally mobile relative to the fixed structure in a direction of translation between a position of closure in which it is close to the fixed cowl and a position of opening in which it is away from the fixed cowl to the rear,
motor means intended to displace the mobile cowl from the position of closure to the position of opening and vice versa,
a window delimited upstream by the fixed cowl and downstream by the mobile cowl, the window being open between a turbojet of a secondary flow and the outside of the nacelle,
a thrust-reversing door mounted to be rotationally mobile about an axis of rotation between a retracted position in which it is positioned inside the mobile cowl and an active position in which it comes across the turbojet, and
a driving mechanism provided to coordinate and defer the switch from the retracted position to the active position of the thrust-reversing door with the switch from the position of closure to the position of opening of the mobile cowl and vice versa, the driving mechanism comprising:
two connecting rods in which each comprises a proximal end mounted to be rotationally mobile on the fixed structure about a connecting rod axis parallel to the axis of rotation and a distal end bearing a wheel mounted to be rotationally mobile about a wheel axis parallel to the axis of rotation,
for each wheel, a groove integral to the mobile cowl and comprising a rectilinear part and an arched part, the rectilinear part being parallel to the direction of translation and extending behind the arched part, in which the wheel slides in the groove,
a guide integral to the thrust-reversing door, and
a runner being, on the one hand, mounted to be rotationally mobile between the two connecting rods about a runner axis parallel to the axis of rotation, and, on the other hand, mounted to slide along the guide.

Such a mechanism allows a displacement of the mobile cowl which is greater than the length of the thrust-reversing door, thus allowing an enlargement of the length of the window.

Advantageously, the arched part has a curvature which starts from the rectilinear part towards the interior of the nacelle, advancing from the rear to the front.

Advantageously, each connecting rod takes the form of an L and the runner axis is arranged at the corner of the L.

Advantageously, the guide is a rod and the runner is passed through by a bore in which the rod is fitted.

The invention also proposes a dual flow turbojet engine comprising an engine and a nacelle according to one of the preceding variants surrounding the engine, and in which a turbojet of a secondary flow is delimited between the nacelle and the engine.

The invention also proposes an aircraft comprising at least one dual flow turbojet engine according to the preceding variant.

BRIEF DESCRIPTION OF THE DRAWINGS

The features of the invention mentioned above, and others, will become more clearly apparent on reading the following description of an exemplary embodiment, the description being given in relation to the attached drawings, among which:

FIG. 1 is a side view of an aircraft comprising a nacelle according to the invention, FIG. 2 is a perspective view of a detail of the driving mechanism allowing the displacement of the thrust-reversing door.

DETAILED DESCRIPTION OF EMBODIMENTS

Figure 3:
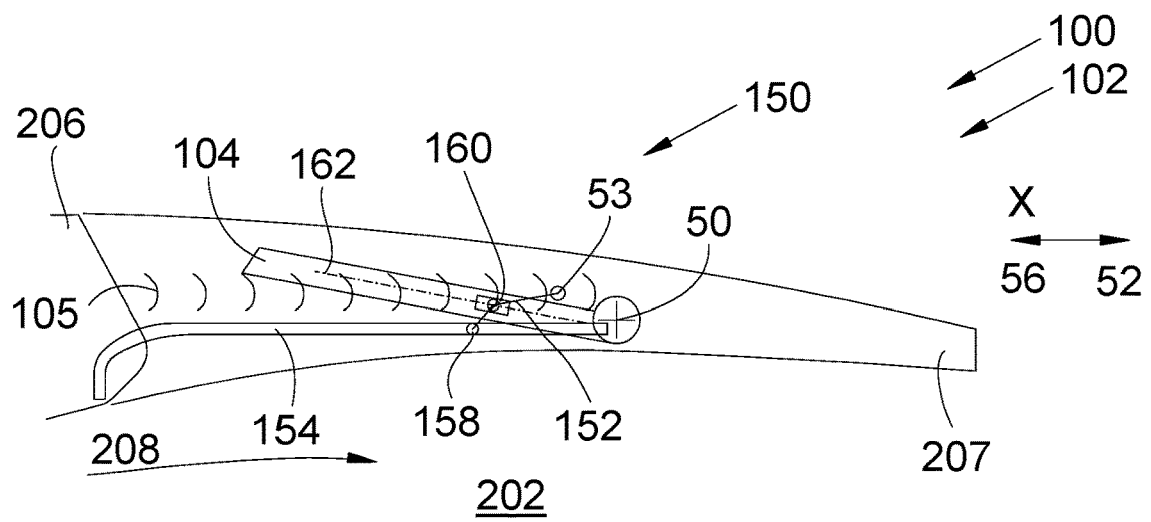
FIGS. 3 to 6 are schematic side view representations of the nacelle according to the invention in different positions of the thrust-reversing door and of the mobile cowl.

In the following description, the terms relating to a position are taken with reference to an aircraft in position of advance as is represented in FIG. 1.

FIG. 1 shows an aircraft 10 which comprises a fuselage 12, on each side of which is fixed a wing 14 which bears at least one dual flow turbojet engine 100 according to the invention. The dual flow turbojet engine 100 is fixed under the wing 14 via a pylon 16.

In the following description, and by convention, X denotes the longitudinal axis of the dual flow turbojet engine 100 which is parallel to the longitudinal axis of the aircraft 10 and which is oriented positively in the direction of advance of the aircraft 10, Y denotes the transverse axis of the dual flow turbojet engine 100 which is horizontal when the aircraft is on the ground, and Z denotes the vertical axis when the aircraft is on the ground, these three directions X, Y and Z being mutually orthogonal.

FIGS. 3 to 6 show the dual flow turbojet engine 100 which comprises a nacelle 102 and an engine 103 which is housed inside the nacelle 102. The dual flow turbojet engine 100 has a turbojet 202 between the nacelle 102 and the engine 103 in which the secondary flow 208 circulates.

The nacelle 102 comprises at least one thrust-reversing door 104. In particular, there can be two thrust-reversing doors 104 arranged facing one another, or four thrust-reversing doors 104 distributed regularly over the periphery of the nacelle 102. Each thrust-reversing door 104 makes it possible, depending on its position, to reverse the thrust of the dual flow turbojet engine 100.

In the following description, the invention is more particularly described for a thrust-reversing door 104, but it applies equally for each thrust-reversing door 104 when there are several thereof.

The nacelle 102 has, for each thrust-reversing door 104, a window 210 that is open between the turbojet 202 and the outside of the nacelle 102. In the embodiment of the invention presented in FIGS. 3 to 6, cascades 105 are arranged across the window 210 to best orient the secondary flow 208.

The nacelle 102 has a fixed cowl 206 which delimits the window 210 upstream relative to the longitudinal axis X and which is fixedly mounted on a fixed structure 201 of the nacelle 102.

The nacelle 102 has a mobile cowl 207 which delimits the window 210 downstream relative to the longitudinal axis X. The mobile cowl 207 is mounted to be translationally mobile in a direction of translation that is globally parallel to the longitudinal axis X on the fixed structure 201. The translation is carried out by any appropriate means, such as, for example, guideways.

The fixed cowl 206 and the mobile cowl 207 each have an outer surface which constitutes the outer jacket of the nacelle 102 and an inner surface which constitutes an outer wall of the turbojet 202.

Figure 4:
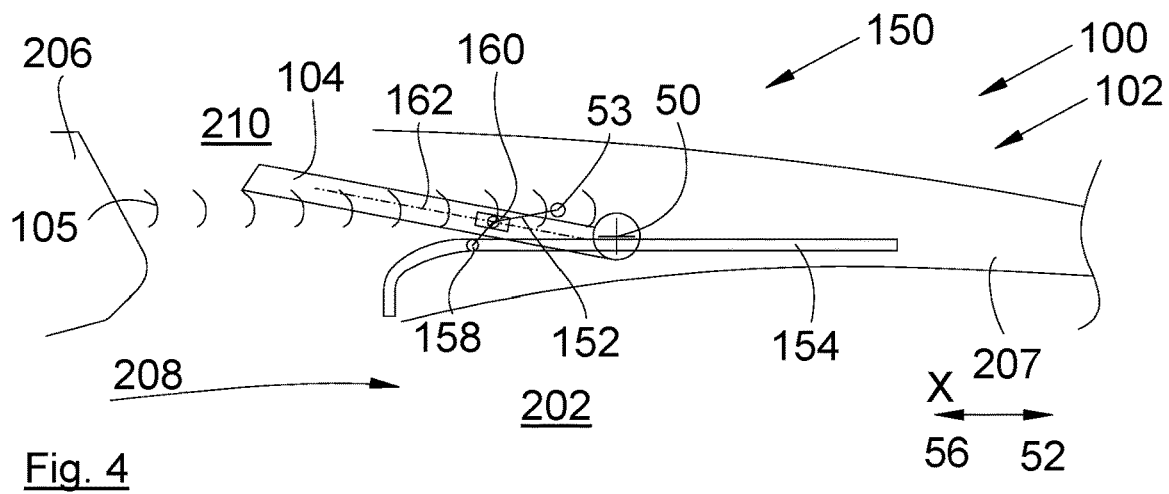
Figure 5:
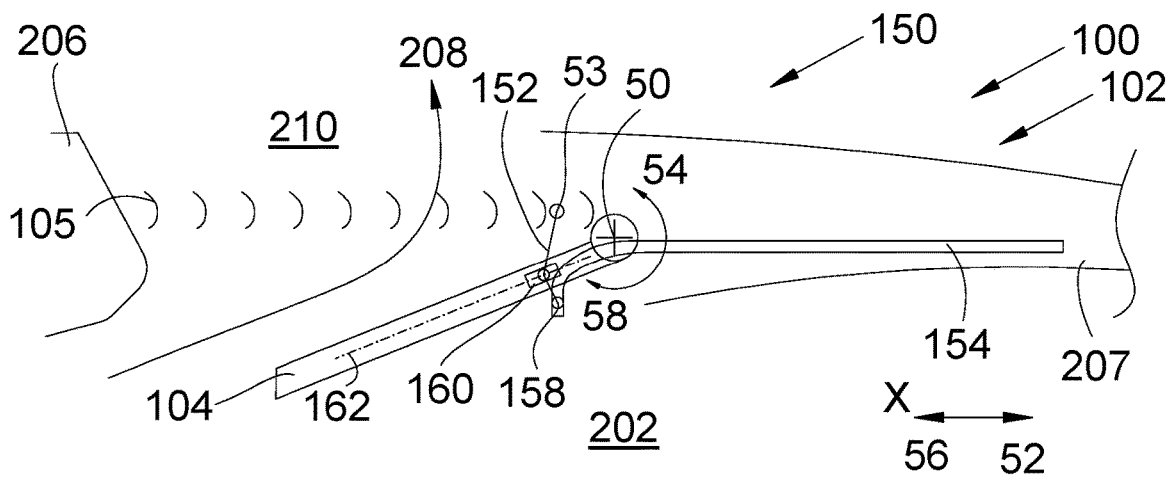
Figure 6:
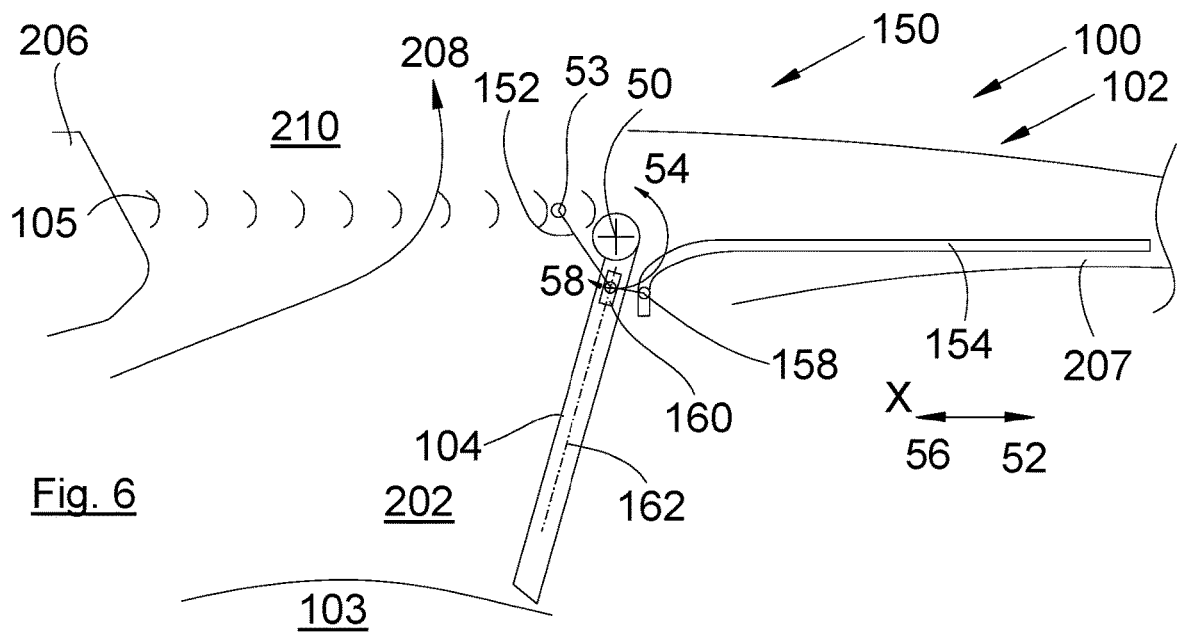

The mobile cowl 207 is mobile between a position of closure (FIG. 3) in which it is close to the fixed cowl 206 and a position of opening in which it is away from the fixed cowl 206 towards the rear so as to widen the window 210. FIGS. 4 and 5 show intermediate positions between the position of closure and the position of opening and FIG. 6 shows the position of opening.

The nacelle 102 also comprises motor means for displacing the mobile cowl 207 from the position of closure to the position of opening and vice versa, and they can comprise, to this end, for example, power cylinders, ball screws, motors or any other appropriate means for translationally displacing an element.

The motor means are controlled by a control unit, of processor type, which for example controls the extension and the shortening of the power cylinders according to the needs of the aircraft 10.

The thrust-reversing door 104 is mounted to be rotationally mobile about an axis of rotation 50 on the fixed structure 201 between a retracted position (FIGS. 3 and 4) and an active position for which the reversal of thrust has maximum effectiveness. FIG. 5 shows an intermediate position between the retracted position and the active position. FIG. 6 shows the active position. In the embodiment of the invention presented in FIGS. 2 to 6, the axis of rotation 50 is, here, at right angles to the longitudinal axis X.

In retracted position, the thrust-reversing door 104 is positioned inside the mobile cowl 207 which is in position of closure. In position of opening, the mobile cowl 207 is displaced towards the rear to facilitate the maneuvering of the thrust-reversing door 104 which switches from the retracted position to the active position.

When the thrust-reversing door 104 is in active position, the thrust-reversing door 104 comes across the turbojet 202 and deflects at least a part of the secondary flow 208 outwards through the window 210.

The switch from the closed position to the open position of the thrust-reversing door 104 is coordinated but deferred relative to the switch from the position of closure to the position of opening of the mobile cowl 207 and vice versa.

In the switch from the retracted position to the active position, the rotation of the thrust-reversing door 104 begins when the mobile cowl 207 passes through a specific intermediate position between the position of closure and the position of opening. Conversely, in the switch from the active position to the retracted position, the rotation of the thrust-reversing door 104 stops when the mobile cowl 207 passes through the specific intermediate position in reverting from the position of opening to the position of closure.

This coordination and this staggering are ensured by a driving mechanism 150 which performs, from the retracted position and from the position of closure, a first combination ensuring:

- a backward translation (arrow 52) of the mobile cowl 207 in a direction of translation that is globally parallel to the longitudinal axis X which ensures the displacement of the mobile cowl 207 from the position of closure to the position of opening, passing through the specific intermediate position,
- from the moment when the mobile cowl 207 passes through the specific intermediate position, a rotation (arrow 54) of the thrust-reversing door 104 about the axis of rotation 50 which ensures the displacement of the thrust-reversing door 104 from the retracted position to the active position while continuing the displacement of the mobile cowl 207 to the position of opening.

As is explained, the backward translation of the mobile cowl 207 continues during the rotation of the thrust-reversing door 104.

Conversely, the switch from the active position to the retracted position of the thrust-reversing door 104 is ensured by the same driving mechanism 150 which is also designed to perform a second combination ensuring, from the active position and from the position of opening:

- a forward translation (arrow 56) of the mobile cowl 207 in the direction of translation which ensures the displacement of the mobile cowl 207 from the position of opening to the position of closure passing through the specific intermediate position, and up to the moment when the mobile cowl 207 passes through the specific intermediate position, a reverse rotation (arrow 58) of the thrust-reversing door 104 about the axis of rotation 50 which ensures the return of the thrust-reversing door 104 from the active position to the retracted position, while continuing the displacement of the mobile cowl 207 to the position of closure, then when the thrust-reversing door 104 is in retracted position, the displacement of the mobile cowl 207 continues to the position of closure.

As is explained, the forward translation of the mobile cowl 207 begins at the same time as the rotation of the thrust-reversing door 104, then the rotation of the thrust-reversing door 104 stops while the translation of the mobile cowl 207 continues.

FIG. 2 shows a detail of the driving mechanism 150.

The driving mechanism 150 comprises:

two connecting rods 152 which are parallel to one another, and in which each comprises a proximal end that is mounted to be rotationally mobile on the fixed structure 201 about a connecting rod axis 53 parallel to the axis of rotation 50 and at a distance therefrom, and a distal end 156 bearing a wheel 158 that is mounted to be rotationally mobile about a wheel axis 57 parallel to the axis of rotation 50 and at a distance therefrom, for each wheel 158, a groove 154 integral to the mobile cowl 207 and comprising a rectilinear part and an arched part, the rectilinear part being parallel to the direction of translation and extending to the rear of the arched part, in which the wheel 158 slides in the groove 154, a guide 162 integral to the thrust-reversing door 104, here at its front end, and a runner 160 being, on the one hand, mounted to be rotationally mobile between the two connecting rods 152 about a runner axis 60 that is parallel to the axis of rotation 50, and, on the other hand, mounted to slide along the guide 162.

In position of closure/retracted position, the wheel 158 is in the rectilinear part.

The operation is then from the position of closure/retracted position:

the control unit controls the motor means to displace the mobile cowl 207 from the position of closure to the position of opening, the backward displacement (arrow 52) of the mobile cowl 207 drives the backward displacement of the grooves 154 and, as long as the wheels 158 are in the rectilinear parts, the connecting rods 152 remain immobile and the thrust-reversing door 104 does not move, when the arched parts reach the wheels 158, the distal ends 156 are pulled towards the interior of the nacelle 102 and the connecting rods 152 pivot about the connecting rod axis 53 in the direction of rotation 54, at the same time, the runner 160 tilts with the connecting rods 152 and, in turn, drives the guide 162 and the thrust-reversing door 104 in rotation about the axis of rotation 50 to switch from the retracted position to the active position.

In position of opening/active position, the wheel 158 is in the arched part.

Conversely, from the position of opening/active position, the operation is then as follows:

the control unit controls the motor means to displace the mobile cowl 207 from the position of opening to the position of closure, the forward displacement (arrow 56) of the mobile cowl 207 drives the forward displacement of the grooves 154 and, since the wheels 158 are in the arched parts, the distal ends 156 are consequently displaced, which drives the rotation of the connecting rods 152 about the connecting rod axis 53 in the direction of rotation 58 and, at the same time, the runner 160 tilts with the connecting rods 152 and, in turn, drives the guide 162 and the thrust-reversing door 104 in rotation about the axis of rotation 50 to switch from the active position to the retracted position, when the rectilinear parts reach the wheels 158, the distal ends 156 and the connecting rods 152 remain immobile and the thrust-reversing door 104 does not move, until the mobile cowl 207 reaches its position of closure.

Such a driving mechanism 150 makes it possible to manage a displacement of the mobile cowl 207 that is greater than the length of the thrust-reversing door 104.

In the movement to reach the position of opening/active position, the wheels 158 are displaced in the groove 154 but not always in the same direction. In particular, at the end of the movement, the wheels 158 tend to move up in the arched parts after having descended. Conversely, at the beginning of the movement to reach the position of closure/retracted position, the wheels 158 tend to descend in the arched parts before moving up.

In the embodiment of the invention presented here, the axis of rotation 50 is at the rear relative to the connecting rod axis 53 which is, itself, at the rear relative to the runner axis 60 in position of closure/retracted position.

The runner 160 is displaced globally in a radial plane of the nacelle 102 containing the longitudinal axis X, such as, for example, the plane XZ in FIG. 2.

The arched part has a curvature which starts from the rectilinear part towards the interior of the nacelle 102, advancing from the rear to the front.

In the embodiment of the invention presented in FIGS. 2 to 6, each connecting rod 152 takes the form of a L, and the runner axis 60 is arranged at the corner of the L, that is to say between the distal end and the proximal end.

In the embodiment of the invention presented here, the guide 162 is a rod which is rectilinear and the runner 160 is passed through by a bore in which the rod is fitted, but it is possible to provide another embodiment, such as, for example, a dovetail mounting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a dual flow turbojet engine, in which two streams of air flow through said nacelle in a direction from a front to a rear of said nacelle, said nacelle comprising:
   a fixed structure,
   a fixed cowl fixedly mounted on the fixed structure and a mobile cowl that is translationally mobile relative to the fixed structure in a direction of translation to switch between a position of closure in which the mobile cowl is close to the fixed cowl and a position of opening in which the mobile cowl is spaced away from the fixed cowl to the rear,
   a motor arrangement configured to displace the mobile cowl from the position of closure to the position of opening and vice versa,
   a window delimited upstream by the fixed cowl and downstream by the mobile cowl, said window being open between a turbojet of a secondary flow and an outside of the nacelle,
   a thrust-reversing door mounted in a rotationally mobile manner to rotate about an axis of rotation and thereby switch between a retracted position in which the thrust-reversing door is positioned inside the mobile cowl and an active position in which the thrust-reversing door comes across the turbojet, and
   a driving mechanism provided to coordinate and defer the switch from the retracted position to the active position of the thrust-reversing door with the switch from the position of closure to the position of opening of the mobile cowl and vice versa, said driving mechanism comprising:
      two connecting rods, wherein each of the connecting rods comprises a proximal end roationally mobilely mounted on the fixed structure about a connecting rod axis parallel to the axis of rotation and a distal end bearing a wheel rotationally mobilely mounted about a wheel axis parallel to the axis of rotation,
      wherein for each of the wheels, a groove is integral to the mobile cowl and comprising a rectilinear part and an arched part, the rectilinear part being parallel to the direction of translation and extending behind the arched part, wherein the wheel slides in said groove,
      a guide integral to the thrust-reversing door, and
      a runner being rotationally mobilely mounted between the two connecting rods about a runner axis parallel to the axis of rotation, and also slidingly mounted relative to the guide.

2. The nacelle according to claim 1, wherein the arched part has a curvature which starts from the rectilinear part towards the an interior of the nacelle, advancing from the rear to the front.

3. The nacelle according to claim 1, wherein each of the connecting rods has an L shape and wherein the runner axis is arranged at a corner of the L shape.

4. The nacelle according to claim 1, wherein the guide is a rod and wherein the runner comprises a bore in which the rod is fitted.

5. A dual flow turbojet engine comprising an engine and a nacelle according to claim 1 surrounding the engine, and wherein the turbojet of the secondary flow is delimited between the nacelle and the engine.

6. An aircraft comprising at least one dual flow turbojet engine according to claim 5.

* * * * *